US010865072B2

(12) United States Patent
Ericson

(10) Patent No.: US 10,865,072 B2
(45) Date of Patent: Dec. 15, 2020

(54) INTERMEDIATE TRANSFER STATION

(71) Applicant: Otis Elevator Company, Farmington, CT (US)

(72) Inventor: Richard J. Ericson, Southington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 354 days.

(21) Appl. No.: 15/749,932

(22) PCT Filed: Aug. 3, 2016

(86) PCT No.: PCT/US2016/045234

§ 371 (c)(1),
(2) Date: Feb. 2, 2018

(87) PCT Pub. No.: WO2017/023962

PCT Pub. Date: Feb. 9, 2017

(65) Prior Publication Data

US 2018/0215586 A1 Aug. 2, 2018

Related U.S. Application Data

(60) Provisional application No. 62/200,327, filed on Aug. 3, 2015.

(51) Int. Cl.
*B66B 9/00* (2006.01)
*B66B 9/02* (2006.01)
(Continued)

(52) U.S. Cl.
CPC ................ *B66B 9/003* (2013.01); *B66B 9/02* (2013.01); *B66B 1/2466* (2013.01); *B66B 11/02* (2013.01)

(58) Field of Classification Search
CPC ..... B66B 1/2491; B66B 1/2466; B66B 9/003; B66B 11/0213
See application file for complete search history.

(56) References Cited

U.S. PATENT DOCUMENTS 633,215 A * 9/1899 Poulson .................. B66B 9/025 198/798
1,939,729 A * 12/1933 Stark ......................... B66B 9/00 187/249
(Continued)

FOREIGN PATENT DOCUMENTS

CN 1160011 A 9/1997
DE 2154923 A1 5/1973
(Continued)

OTHER PUBLICATIONS

Chinese First Office Action for application 201680045519.9, dated Feb. 22, 2019, 50 pages.
(Continued)

*Primary Examiner* — Minh Truong
(74) *Attorney, Agent, or Firm* — Cantor Colburn LLP

(57) ABSTRACT

A method and system for managing an elevator system (10), includes providing at least one elevator car (14) to travel in a hoistway (11), and selectively introducing and removing the at least one elevator car (14) to and from the hoistway (11) via an intermediate transfer station (50) disposed at an intermediate floor location, wherein the intermediate transfer station (50) includes a service lift (54).

8 Claims, 3 Drawing Sheets

(51) Int. Cl.
*B66B 11/02* (2006.01)
*B66B 1/24* (2006.01)

(56) References Cited

U.S. PATENT DOCUMENTS

| | | | | |
|---|---|---|---|---|
| 2,052,690 | A * | 9/1936 | Austin | B66B 7/021 187/249 |
| 3,658,155 | A | 4/1972 | Salter | |
| 5,090,515 | A | 2/1992 | Takahashi et al. | |
| 5,501,295 | A | 3/1996 | Muller et al. | |
| 5,655,625 | A | 8/1997 | Barker et al. | |
| 5,758,748 | A * | 6/1998 | Barker | B66B 9/00 187/249 |
| 5,861,586 | A * | 1/1999 | McCarthy | B61B 15/00 187/289 |
| 5,924,524 | A * | 7/1999 | Barker | B66B 1/2458 187/249 |
| 6,955,245 | B2 | 10/2005 | Dunser et al. | |
| 7,621,376 | B2 | 11/2009 | Duenser et al. | |
| 7,917,341 | B2 | 3/2011 | Sansevero et al. | |
| 8,297,409 | B2 | 10/2012 | Hsu et al. | |
| 9,598,265 | B1 * | 3/2017 | Jacobs | B66B 9/003 |
| 2007/0181374 | A1 | 8/2007 | Mueller | |
| 2008/0247848 | A1 * | 10/2008 | Freudelsperger | B65G 1/0492 414/277 |
| 2011/0042168 | A1 | 2/2011 | Grundmann | |
| 2014/0190774 | A1 | 7/2014 | Hsu et al. | |

FOREIGN PATENT DOCUMENTS

| | | | |
|---|---|---|---|
| EP | 0781724 | A2 | 7/1997 |
| EP | 1693331 | A1 | 8/2006 |
| JP | H05116877 | A | 5/1993 |
| JP | H11263553 | A | 9/1999 |
| KR | 100271022 | B1 | 11/2000 |
| WO | 2014158127 | A1 | 10/2014 |
| WO | 2015084370 | A1 | 6/2015 |

OTHER PUBLICATIONS

International Search Report for application PCT/US2016/045234, dated Oct. 21, 2016, 11 pages.

* cited by examiner

INTERMEDIATE TRANSFER STATION

DESCRIPTION OF RELATED ART

The subject matter disclosed herein relates generally to the field of elevators, and more particularly to a multicar, ropeless elevator system.

Ropeless elevator systems, also referred to as self-propelled elevator systems, are useful in certain applications (e.g., high rise buildings) where the mass of the ropes for a roped system is prohibitive, roped elevator core space can become too large, and there is a desire for multiple elevator cars to travel in a single lane. There exist ropeless elevator systems with multiple lanes in which some lanes are designated for upward traveling elevator cars and some lanes are designated for downward traveling elevator cars. Transfer stations at various locations in the hoistway are used to move cars horizontally between these various upward and downward moving lanes. A system and method that can selectively introduce and remove elevator cars from a ropeless elevator system at an intermediate hoistway location is desired to optimize performance and service.

BRIEF SUMMARY

According to an embodiment, an elevator system includes at least one elevator car to travel in a hoistway, and an intermediate transfer station disposed at an intermediate floor location to selectively introduce and remove the at least one elevator car to and from the hoistway, wherein the intermediate transfer station includes a service lift.

In addition to one or more of the features described above, or as an alternative, further embodiments could include that the intermediate transfer station includes an intermediate parking area.

In addition to one or more of the features described above, or as an alternative, further embodiments could include that the elevator system includes a plurality of intermediate transfer stations disposed at predetermined locations along the hoistway.

In addition to one or more of the features described above, or as an alternative, further embodiments could include that the at least one elevator car can pass through the service lift.

In addition to one or more of the features described above, or as an alternative, further embodiments could include that the service lift includes a hoist to engage with the at least one elevator car.

In addition to one or more of the features described above, or as an alternative, further embodiments could include that the intermediate transfer station is temporary.

According to an embodiment, a method for managing an elevator system includes providing at least one elevator car to travel in a hoistway, and selectively introducing and removing the at least one elevator car to and from the hoistway via an intermediate transfer station disposed at an intermediate floor location, wherein the intermediate transfer station includes a service lift.

In addition to one or more of the features described above, or as an alternative, further embodiments could include parking the at least one elevator car in an intermediate parking area of the intermediate transfer station.

In addition to one or more of the features described above, or as an alternative, further embodiments could include that the elevator system includes a plurality of intermediate transfer stations disposed at predetermined locations along the hoistway.

In addition to one or more of the features described above, or as an alternative, further embodiments could include that the at least one elevator car can pass through the service lift.

In addition to one or more of the features described above, or as an alternative, further embodiments could include engaging the at least one elevator car via a hoist of the service lift.

In addition to one or more of the features described above, or as an alternative, further embodiments could include that the intermediate transfer station is temporary.

Technical function of the embodiments described above includes an intermediate transfer station disposed at an intermediate floor location to selectively introduce and remove the at least one elevator car to and from the hoistway.

Other aspects, features, and techniques of the embodiments will become more apparent from the following description taken in conjunction with the drawings.

BRIEF DESCRIPTION OF THE SEVERAL VIEWS OF THE DRAWINGS

The subject matter is particularly pointed out and distinctly claimed in the claims at the conclusion of the specification. The foregoing and other features, and advantages of the embodiments are apparent from the following detailed description taken in conjunction with the accompanying drawings in which like elements are numbered alike in the several FIGURES:

DETAILED DESCRIPTION

Figure 1:
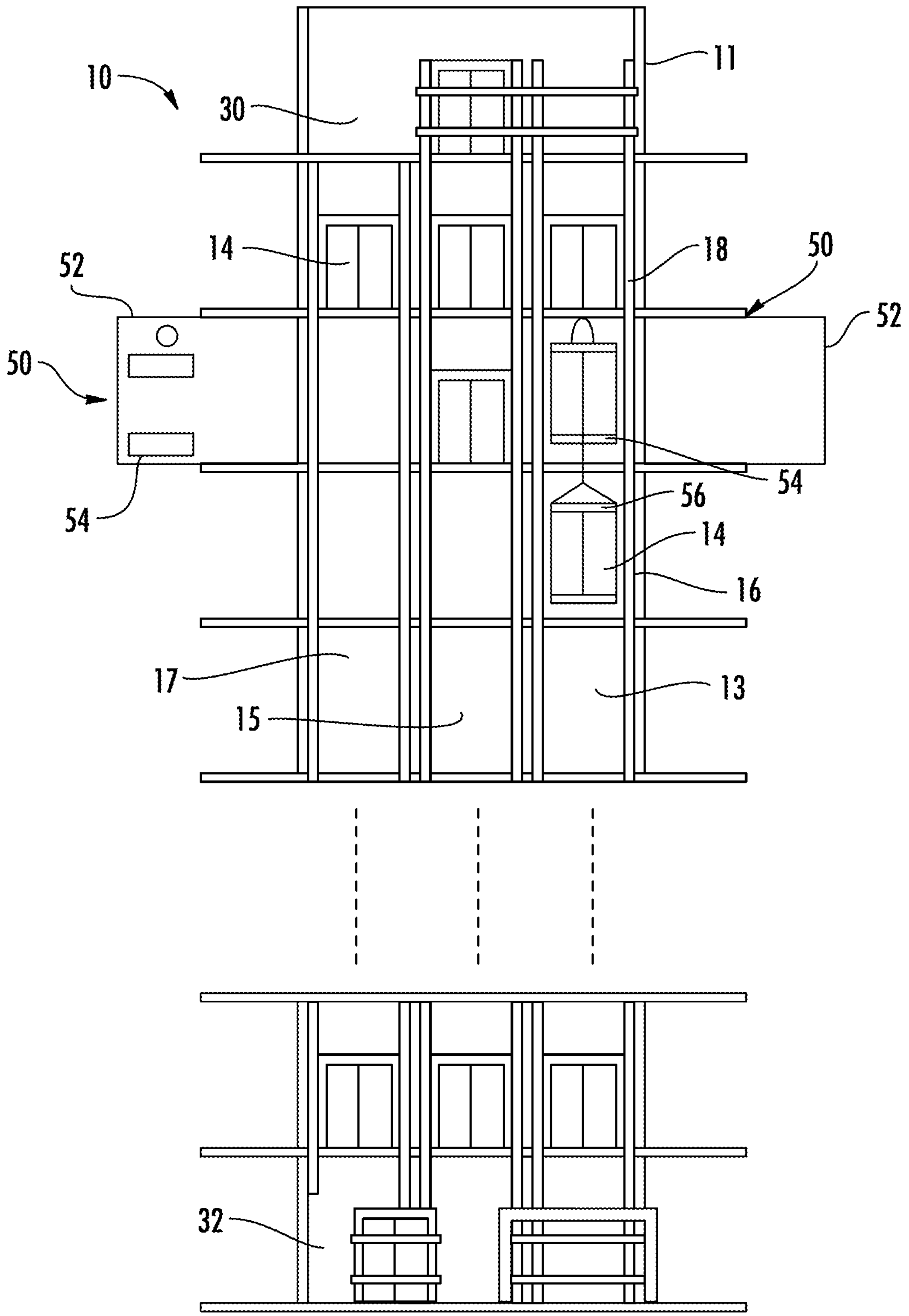
FIG. 1 depicts a multicar elevator system in an illustrated embodiment.

FIG. 1 depicts a multicar, ropeless elevator system 10 in an illustrated embodiment. Elevator system 10 includes a hoistway 11 having a plurality of lanes 13, 15 and 17. In certain embodiments, elevator system 10 includes modular components that can be associated to form an elevator system. Modular components include, but are not limited to a landing floor hoistway, a shuttle floor hoistway, a transfer station, a carriage, a parking area, a disengaging mechanism, etc. While three lanes are shown in FIG. 1, it is understood that embodiments may be used with multicar, ropeless elevator systems have any number of lanes. In each lane 13, 15, 17, cars 14 travel in mostly in one direction, i.e., up or down. For example, in FIG. 1 cars 14 in lanes 13 and 15 travel up and cars 14 in lane 17 travel down. One or more cars 14 may travel in a single lane 13, 15, and 17. In certain embodiments, cars 14 can move bi-directionally within lanes 13, 15, 17. In certain embodiments, lanes 13, 15, 17 can support shuttle functionality during certain times of the day, such as peak hours, allowing unidirectional, selective stopping, or switchable directionality as required. In certain embodiments, lanes 13, 15, 17 can include localized directionality, wherein certain areas of lanes 13, 15, 17 and hoistway 11 are assigned to various functions and building portions. In certain embodiments, cars 14 can circulate in a limited area of hoistway 11. In certain embodiments, cars 14 can operate at a reduced velocity to reduce operating and equipment costs. In other embodiments, hoistways 11 and lanes 13, 15, 17 can operate in a mixed mode operation wherein portions of hoistway 11 and lanes 13, 15, 17 operate normally (unidirectional or bidirectional) and other portions operate in another manner, including but not limited to, unidirectional, bidirectional, or in a parking mode. In certain embodiments, parked cars 14*a* can be parked in lanes 13, 15, 17 when lanes are designated for parking.

Above the top floor is an upper transfer station 30 to impart horizontal motion to elevator cars 14 to move elevator cars 14 between lanes 13, 15 and 17. In an illustrated embodiment, upper transfer station 30 and lower transfer station 32 in addition to other transfer stations can be disposed at any suitable location. It is understood that upper transfer station 30 may be located at the top floor, rather than above the top floor. Below the first floor is a lower transfer station 32 to impart horizontal motion to elevator cars 14 to move elevator cars 14 between lanes 13, 15 and 17. It is understood that lower transfer station 32 may be located at the first floor, rather than below the first floor. Cars 14 are propelled using, for example, a linear motor system having a primary, fixed portion 16 and a secondary, moving portion 18. One or more fixed portions 16 are mounted in lanes 13, 15 and 17. One or more moving portions 18 are mounted on cars 14. One of the motor portions is supplied with drive signals to control movement of cars 14 in their respective lanes. In certain embodiments, lanes of hoistway 11 can be shut down or restricted based on operator input or elevator system conditions.

In an illustrated embodiment, the elevator system 10 can include at least one intermediate transfer station 50. The intermediate transfer station 50 allows for cars 14 to be removed and introduced from hoistways 11 without traveling to the upper transfer station 30 or the lower transfer station 32. In certain embodiments, the elevator system 10 can include multiple intermediate transfer stations 50 at various vertical locations within the hoistway 11 to engage and transfer cars 14 within the hoistway 11. In certain embodiments, the intermediate transfer station 50 can service some or all of the lanes of the elevator system 10.

Figure 2:
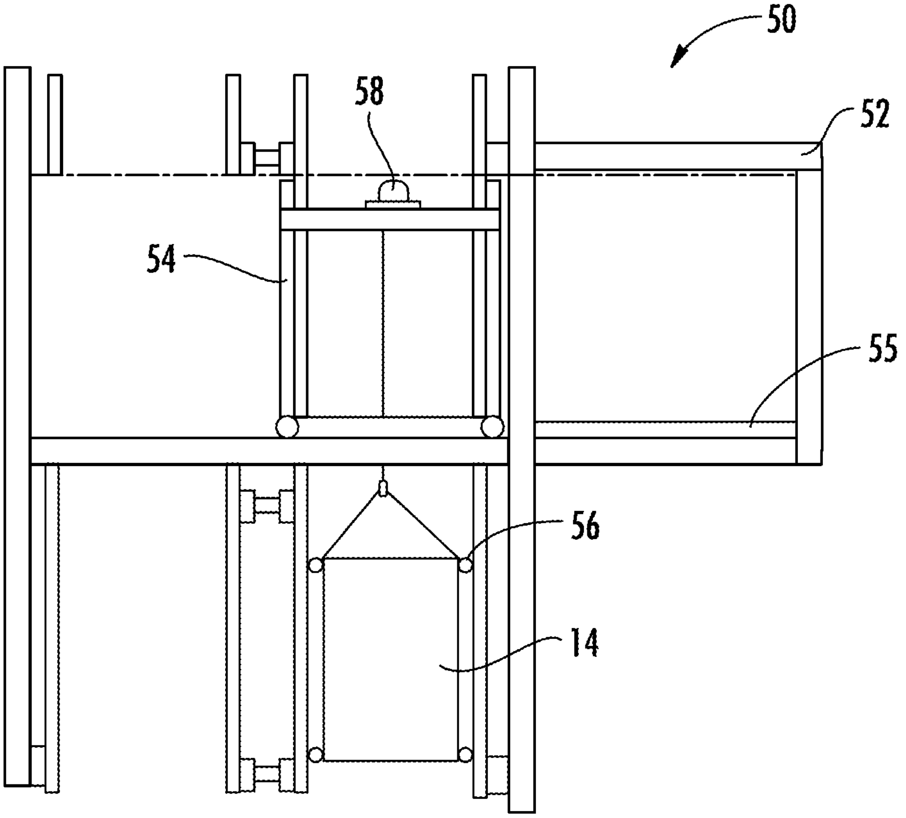
FIG. 2 shows an intermediate transfer station for use in a multicar elevator system, such as the system depicted in FIG. 1.

Referring to FIG. 2, an intermediate transfer station 50 is shown. In an illustrated embodiment, the intermediate transfer station 50 includes an intermediate parking area 52, a service lift 54, and guide rails 55. The service lift 54 can engage, lift, and remove a disabled car 14 to the intermediate parking area 52. Advantageously, the service lift 54 can quickly restore traffic flow in the hoistway 11 in the event than a car 14 becomes disabled.

In an illustrated embodiment, the service lift 54 can translate along guide rails 55. In certain embodiments, the service lift 54 can directly engage with a car 14 to impart horizontal motion upon the car 14 to move the car 14 out of the hoistway 11. In an illustrated embodiment, the intermediate parking area 52 can be utilized to temporarily park a car 14. Similarly, the service lift 54 can engage the car 14 to transport the car 14 from the intermediate parking area 52 back into the hoistway 11. In an illustrated embodiment, the service lift 54 allows for cars 14 to pass there through to allow the circulation of cars 14 in the hoistway 11 when it is not desired or required for the cars 14 to be transferred out of the hoistway 11. The service lift 54 can include a section or multiple sections of linear motor coils to allow cars 14 to travel through the service lift 54. In certain embodiments, the service lift 54 can utilize flexible power connections, power rails, etc. to allow the service lift to maintain power to the linear motor coils as the service lift 54 is moved as described herein.

Advantageously, the intermediate transfer station 50 can allow for cars 14 to be inserted or removed from the hoistway 11 without requiring the car 14 to travel to a terminal location such as the upper or lower end of the hoistway. In certain embodiments, the use of intermediate transfer stations 50 can enable the use of the elevator system 10 before an upper transfer station 30 has been installed, for example, during construction of a building or complete assembly of the elevator system 10. The use of one or more intermediate transfer stations 50 allows a traffic flow loop for use of the elevator system 10 service before the entire elevator system 10 is completed. The intermediate transfer station 50 can facilitate the lifting and position of hoistway equipment, such as rails and brackets as the building in incrementally built. In certain embodiments, the intermediate transfer station 50 can be permanently or temporarily installed within the elevator system 10.

In an illustrated embodiment, the intermediate transfer station 50 can be used to recover immobilized cars 14. Cars 14 may be immobilized due to equipment failure, power failure, etc. In an illustrated embodiment, the intermediate transfer station 50 includes a deployable hoist 58 to allow recovery of immobilized cars 14 from within the hoistway 11. In certain embodiments, the hoist 58 can be deployed as required. The hoist 58 can attach to an immobilized car 14 via a hoist attachment 56. The hoist attachment 56 can interact with features of the car 14 to allow for a positive engagement with the car 14. After the car 14 is engaged with the hoist attachment 56, the hoist 58 may be employed to retract to move car 14 within the service lift 54. In an illustrated embodiment, the service lift 54 can then laterally translate to move the car 14 into the intermediate parking area 52. Advantageously, an immobilized car 14 can be inspected, serviced, etc. within the intermediate parking area 52. In certain embodiments, the hoist 58 can lower the car 14 to a lower extent of the hoistway 11. After a car 14 is serviced, the service lift 54 can reintroduce the car 14 into the hoistway. In certain embodiments, one or more intermediate transfer stations 50 can be positioned to provide recovery capability with hoists 58 of a limited cable length. During normal operation, the hoist 58 can be moved or otherwise retracted to allow cars 14 to pass therethrough. In certain embodiments, the hoist 58 can be on a sliding track to allow the hoist 58 to translate from the intermediate parking area 52 to the hoistway 11 as needed.

Figure 3:
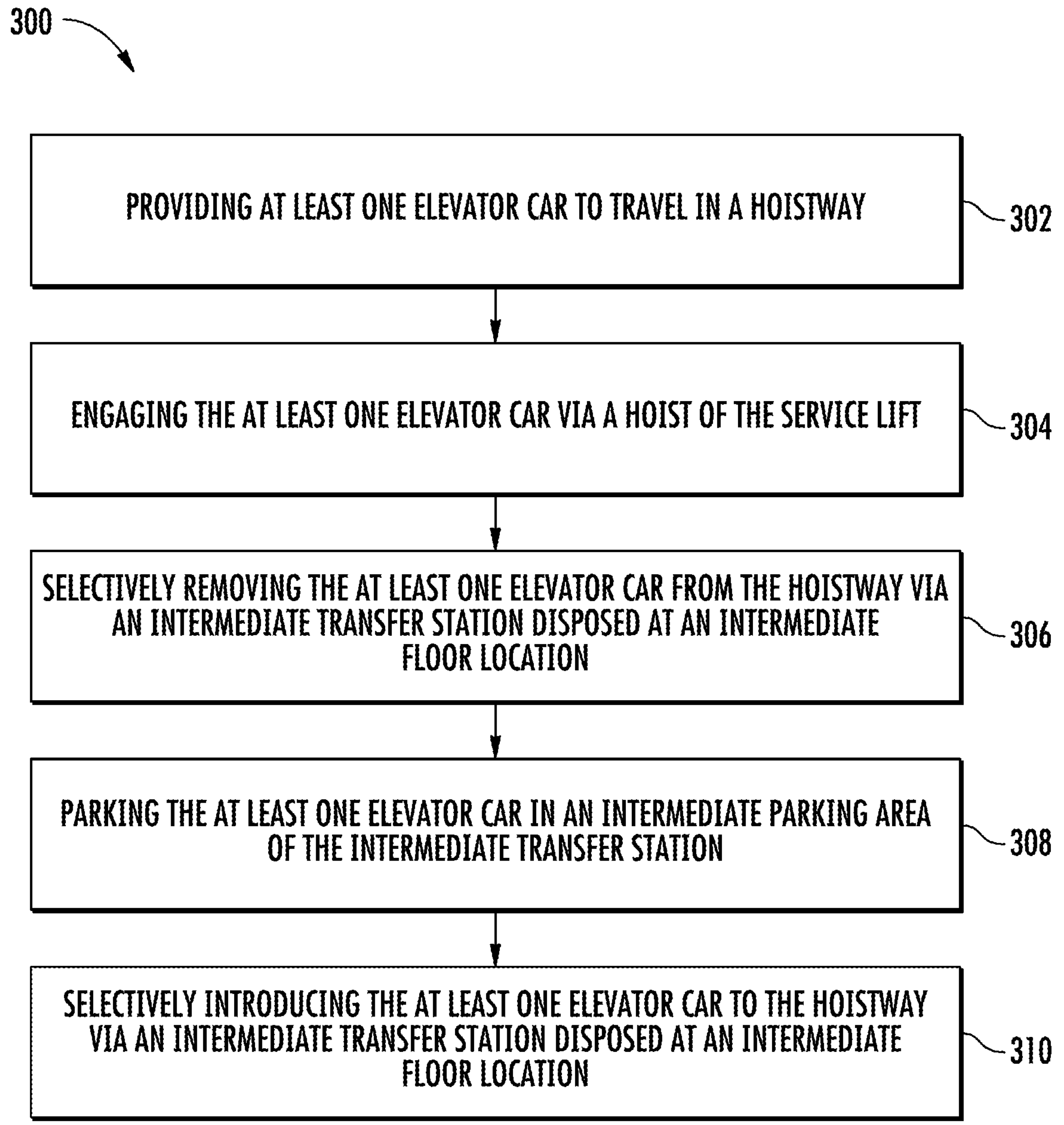
FIG. 3 shows a method for managing a multicar elevator system.

Referring to FIG. 3, a method 300 is shown to manage an elevator system. In operation 302, at least one elevator car to travel in a hoistway is provided. In certain embodiments, one or more cars may travel in a single lane of a hoistway. In certain embodiments, cars can move bi-directionally within lanes of the hoistway.

In operation 304, the at least one elevator car is engaged by a hoist of the service lift. In certain embodiments, in response to an immobilized car, the hoist of the service lift can attach to an immobilized car via a hoist attachment. The hoist attachment can interact with features of the car to allow for a positive engagement with the car. After the car is engaged with the hoist, the hoist may retract to move car within the service lift.

In operation 306, the at least one elevator car is removed from the hoistway via an intermediate transfer station disposed at an intermediate floor location. In certain embodiments, the service lift can directly engage with a car to impart horizontal motion upon the car to move the car out of the hoistway.

In operation 308, the at least one elevator car is parked in an intermediate parking area of the intermediate transfer station. In an illustrated embodiment, the intermediate parking area can be utilized to temporarily park a car. In certain embodiments, a car can be serviced in the parking area.

In operation 310, the at least one elevator car is introduced to the hoistway via an intermediate transfer station disposed at an intermediate floor location. In certain embodiments, the service lift can engage the car to transport the car from the intermediate parking area back into the hoistway.

The terminology used herein is for the purpose of describing particular embodiments only and is not intended to be limiting of the embodiments. While the description of the present embodiments has been presented for purposes of illustration and description, it is not intended to be exhaustive or limited to the embodiments in the form disclosed. Many modifications, variations, alterations, substitutions or equivalent arrangement not hereto described will be apparent to those of ordinary skill in the art without departing from the scope and spirit of the embodiments. Additionally, while various embodiments have been described, it is to be understood that aspects may include only some of the described embodiments. Accordingly, the embodiments are not to be seen as limited by the foregoing description, but are only limited by the scope of the appended claims.

What is claimed is:

1. An elevator system comprising:

at least one elevator car to travel in a hoistway;

an intermediate transfer station disposed at an intermediate floor location to selectively introduce and remove the at least one elevator car to and from the hoistway, wherein the intermediate transfer station includes a service lift, the service lift includes a hoist to engage with the at least one elevator car;

a linear motor system including a primary, fixed portion in the hoistway and a secondary, moving portion mounted to the at least one elevator car, wherein the service lift includes at least one section of linear motor coils to impart motion to the at least one elevator car through the service lift.

2. The elevator system of claim 1, wherein the intermediate transfer station includes an intermediate parking area.

3. The elevator system of claim 1, wherein the elevator system includes a plurality of intermediate transfer stations disposed at predetermined locations along the hoistway.

4. The elevator system of claim 1, wherein the intermediate transfer station is temporarily installed.

5. A method for managing an elevator system, comprising:

providing at least one elevator car to travel in a hoistway; and selectively introducing and removing the at least one elevator car to and from the hoistway via an intermediate transfer station disposed at an intermediate floor location, wherein the intermediate transfer station includes a service lift; further comprising engaging the at least one elevator car via a hoist of the service lift;

wherein the elevator system includes a linear motor system including a primary, fixed portion in the hoistway and a secondary, moving portion mounted to the at least one elevator car, wherein the service lift includes at least one section of linear motor coils to impart motion to the at least one elevator car through the service lift.

6. The method of claim 5, further comprising parking the at least one elevator car in an intermediate parking area of the intermediate transfer station.

7. The method of claim 5, wherein the elevator system includes a plurality of intermediate transfer stations disposed at predetermined locations along the hoistway.

8. The method of claim 5, wherein the intermediate transfer station is temporarily installed.

* * * * *